US007027492B2

(12) United States Patent
Bertrand et al.

(10) Patent No.: US 7,027,492 B2
(45) Date of Patent: Apr. 11, 2006

(54) WIRELESS COMMUNICATION SYSTEM WITH PROCESSOR REQUESTED RAKE FINGER TASKS

(75) Inventors: Pierre Bertrand, Antibes (FR); Sundararajan Sriram, Plano, TX (US); Frank Honore, Boston, MA (US); Eric Biscondi, Opio (FR)

(73) Assignee: Texas Instruments Incorporated, Dallas, TX (US)

( * ) Notice: Subject to any disclaimer, the term of this patent is extended or adjusted under 35 U.S.C. 154(b) by 884 days.

(21) Appl. No.: 10/136,641

(22) Filed: May 1, 2002

(65) Prior Publication Data

US 2003/0206575 A1 Nov. 6, 2003

(51) Int. Cl.
*H04B 1/707* (2006.01)

(52) U.S. Cl. ...................................... 375/148; 375/150

(58) Field of Classification Search ........ 375/140–150, 375/343, 367; 370/320, 335, 342, 441
See application file for complete search history.

(56) References Cited

U.S. PATENT DOCUMENTS

| | | | | |
|---|---|---|---|---|
| 6,366,606 | B1 * | 4/2002 | Sriram | 375/150 |
| 6,611,512 | B1 * | 8/2003 | Burns | 370/342 |
| 6,650,694 | B1 * | 11/2003 | Brown et al. | 375/150 |
| 6,690,713 | B1 * | 2/2004 | Kim et al. | 375/147 |
| 6,792,031 | B1 * | 9/2004 | Sriram et al. | 375/147 |
| 2001/0030980 | A1 | 10/2001 | Rouphael et al. | |

FOREIGN PATENT DOCUMENTS

| | | |
|---|---|---|
| EP | 0 681 754 A2 | 1/1996 |
| EP | 0 794 623 A2 | 9/1997 |

* cited by examiner

*Primary Examiner*—Don N. Vo
(74) *Attorney, Agent, or Firm*—Ronald O. Neerings; Wade James Brady, III; Frederick J. Telecky, Jr.

(57) ABSTRACT

A wireless base station (20). The base station comprises at least one receive antenna ($AT_{RXn}$) for receiving communication signals from at least one transmitting station (UST), and the signals are spread with a plurality of chips. The base station further comprises circuitry (52) for selecting a set of chips corresponding to a first signal received by the at least one receive antenna and circuitry (60) for forming a set of de-spread chips corresponding to the set of chips and in response to a code. Still further, the base station comprises a functional data path (56) comprising an accumulator for receiving the set of de-spread chips and circuitry for receiving an instruction. The functional data path is operable in response to a first instruction, received by the circuitry for receiving an instruction, to accumulate ($62_1$ or $62_2$) a first number of de-spread chips in the set of de-spread chips for producing at least one corresponding symbol. The functional data path is operable in response to a second instruction, received by the circuitry for receiving an instruction, to accumulate ($62_3$) a second number of de-spread chips in the set of de-spread chips for producing an EOL measure.

28 Claims, 5 Drawing Sheets

70

| ENTRY | |
|---|---|
| 1 | WALSH SUB-TASK/EOL SUB-TASK |
| 2 | WALSH SUB-TASK |
| 3 | WALSH SUB-TASK |
| 4 | WALSH SUB-TASK |

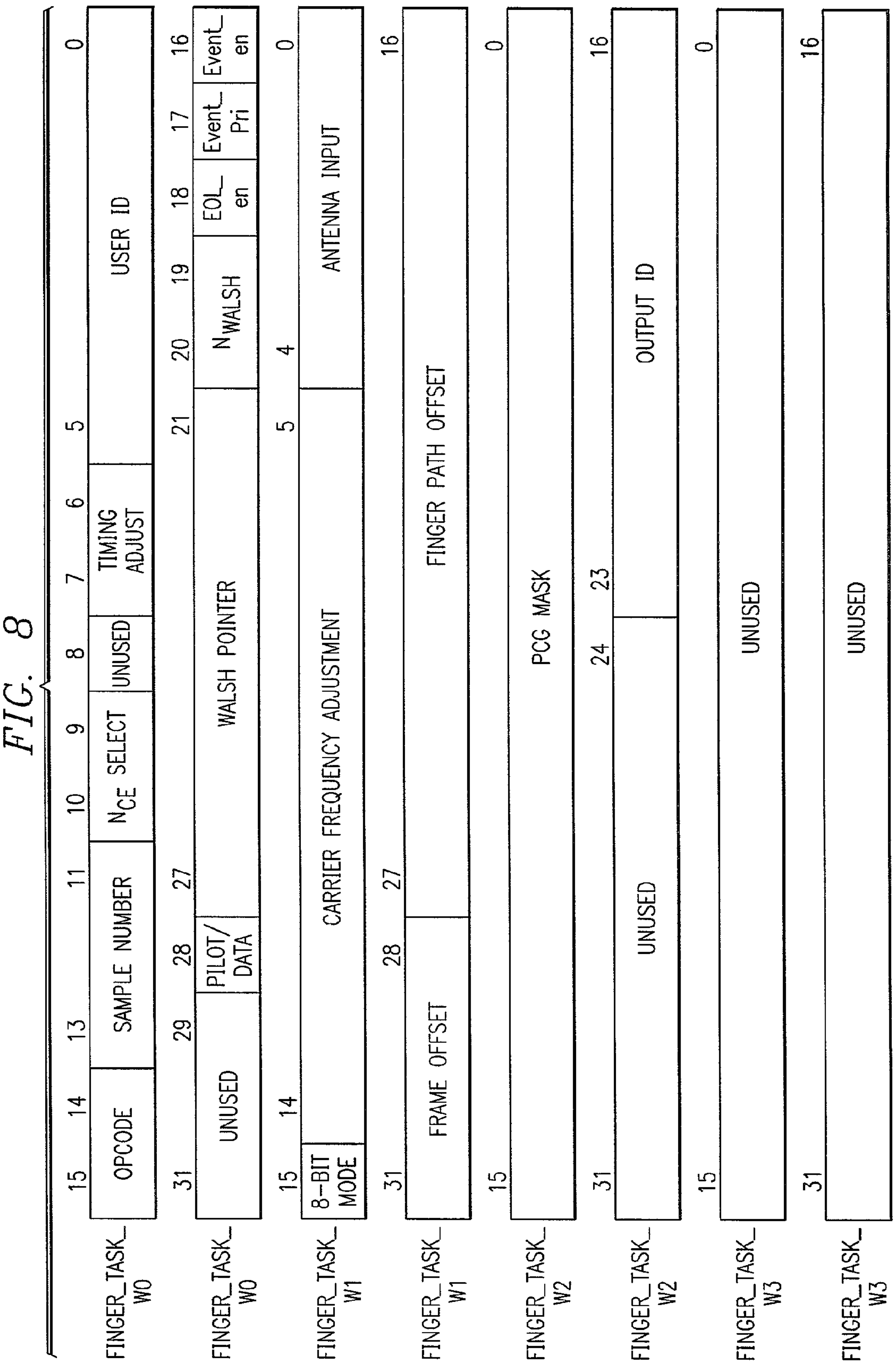

FIG. 8

| | 15 | 14 13 | 11 | 10 9 | 8 | 7 6 | 5 | 0 |
|---|---|---|---|---|---|---|---|---|
| FINGER_TASK_ W0 | OPCODE | SAMPLE NUMBER | | $N_{CE}$ SELECT | UNUSED | TIMING ADJUST | | USER ID |

| | 31 | 29 28 | 27 | | | | | 16 |
|---|---|---|---|---|---|---|---|---|
| FINGER_TASK_ W0 | UNUSED | PILOT/ DATA | WALSH POINTER | | | | | $N_{WALSH}$ | EOL_ en | Event_ Pri | Event_ en |

| | 31 | 29 | 28 | 27 | 21 | 20 19 | 18 | 17 | 16 |
|---|---|---|---|---|---|---|---|---|---|
| FINGER_TASK_ W0 | UNUSED | | PILOT/DATA | WALSH POINTER | | $N_{WALSH}$ | EOL_en | Event_Pri | Event_en |

| | 15 | 14 | | | | | | | 0 |
|---|---|---|---|---|---|---|---|---|---|
| FINGER_TASK_ W1 | 8-BIT MODE | CARRIER FREQUENCY ADJUSTMENT | | | | | | | ANTENNA INPUT |

| | 31 | 28 27 | | 21 | 20 | | 5 | 4 | 0 |
|---|---|---|---|---|---|---|---|---|---|
| FINGER_TASK_ W1 | FRAME OFFSET | | | | | | FINGER PATH OFFSET | | |

| | 15 | | | | | | | | 0 |
|---|---|---|---|---|---|---|---|---|---|
| FINGER_TASK_ W2 | PCG MASK | | | | | | | | |

| | 31 | 24 | 23 | | | | | | 16 |
|---|---|---|---|---|---|---|---|---|---|
| FINGER_TASK_ W2 | UNUSED | | | | | | | | OUTPUT ID |

| | 15 | | | | | | | | 0 |
|---|---|---|---|---|---|---|---|---|---|
| FINGER_TASK_ W3 | UNUSED | | | | | | | | |

| | 31 | | | | | | | | 16 |
|---|---|---|---|---|---|---|---|---|---|
| FINGER_TASK_ W3 | UNUSED | | | | | | | | |

WIRELESS COMMUNICATION SYSTEM WITH PROCESSOR REQUESTED RAKE FINGER TASKS

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to wireless communications systems and are more particularly directed to a wireless communication system with a highly flexible and integrated base station that operates in part to perform processor requested RAKE finger tasks.

Wireless communications have become prevalent in business, personal, and other applications, and as a result the technology for such communications continues to advance in various areas. One such advancement includes the use of spread spectrum communications, including that of code division multiple access ("CDMA"). In such communications, a user station (e.g., a hand held cellular phone) communicates with a base station, where typically the base station corresponds to a "cell." CDMA systems are characterized by simultaneous transmission of different data signals over a common channel by assigning each signal a unique code.

CDMA includes various different operating modes and standards that are introduced here because they are also supported in the preferred embodiments. The modes include a 1×RTT mode sometimes referred to in the art as Radio Configuration 3 and 4 ("RC 3&4"), and an IS95 mode sometimes referred to in the art as Radio Configuration 1 and 2 ("RC 1&2"). In addition, CDMA continues to advance along with corresponding standards that have brought forth a third generation CDMA also referred to as 3G cellular. 3G cellular includes two standards, namely, IS2000 which is Qualcom based and supports IS95 in one operational mode, and a wideband CDMA which is also referred to as WCDMA and which has a 3GPP standard.

With respect to base station operations in various CDMA systems, the base station generally receives and manages signals from numerous different user stations. Typically, the user stations are mobile and for this and other reasons the signals received by the base station from the user station are subject to various effects imposed on the signal as they are communicated to the base station. In addition, CDMA signals are modulated, or "spread," with one or more pseudo-noise ("PN") codes, such as a short code, a long code, and possibly a Walsh code based on the type of symbol being communicated as well as the operational mode. Accordingly and with the advancement and evolution of CDMA, base stations are known in the art to include sufficient circuitry to demodulate, or "de-spread," such codes from the communication. The prior art typically includes complex multiplication and accumulation circuits that are physically duplicated to process different received signals at the same time, thereby deciphering the symbol information encoded in those signals. This process is commonly performed by a device that is part of the base station and that is referred to as a RAKE receiver; the RAKE is said to have fingers and each finger is assigned to process an incoming signal. The decoded symbols may represent multiple paths from a single transmission by the same user station, as further detailed below. Accordingly, prior art base stations often include circuitry to separately identify and process these multiple paths and also to combine the signals in an effort to improve signal performance (e.g., as measured by signal-to-noise ratio, bit error rate, or some other type of measure).

While the above-discussed state of the art has supported usable spread spectrum communications, the present inventors have observed various drawbacks. For example, presently in the prior art, a RAKE receiver may include duplicate physical circuits representing the different fingers of the RAKE, and often certain duplicate information (e.g., de-spreading codes) are hard-coded or stored in multiple locations so as to be provided to each finger. The duplicate circuits as well as the need to duplicate information is inefficient in many respects, such as increasing device size, complexity, and cost. Such attributes are often highly undesirable and indeed sometimes unacceptable in the continued advancement of the competitive market for cellular devices. As another drawback, various prior art RAKE devices have fixed uses and thus lack programmability. Accordingly, they are relatively inflexible or require considerable re-design if it is desired to operate the system with different parameters. Still other drawbacks and limitations may be observed by one skilled in the art.

In view of the above, there arises a need to provide an improved wireless system, as is achieved by the preferred embodiments discussed below.

BRIEF SUMMARY OF THE INVENTION

In the preferred embodiment, there is a wireless base station. The base station comprises at least one receive antenna for receiving communication signals from at least one transmitting station, and the signals are spread with a plurality of chips. The base station further comprises circuitry for selecting a set of chips corresponding to a first signal received by the at least one receive antenna and circuitry for forming a set of de-spread chips corresponding to the set of chips and in response to a code. Still further, the base station comprises a functional data path comprising an accumulator for receiving the set of de-spread chips and circuitry for receiving an instruction. The functional data path is operable in response to a first instruction, received by the circuitry for receiving an instruction, to accumulate a first number of de-spread chips in the set of de-spread chips and for producing at least one corresponding symbol. The functional data path is operable in response to a second instruction, received by the circuitry for receiving an instruction, to accumulate a second number of de-spread chips in the set of de-spread chips and for producing an EOL measure. Other circuits, systems, and methods are also disclosed and claimed.

BRIEF DESCRIPTION OF THE SEVERAL VIEWS OF THE DRAWING

FIG. 8 illustrates the preferred format of a 128-bit instruction for causing the various RC 3&4 mode task operations in the correlator coprocessor.

DETAILED DESCRIPTION OF THE INVENTION

Figure 1:
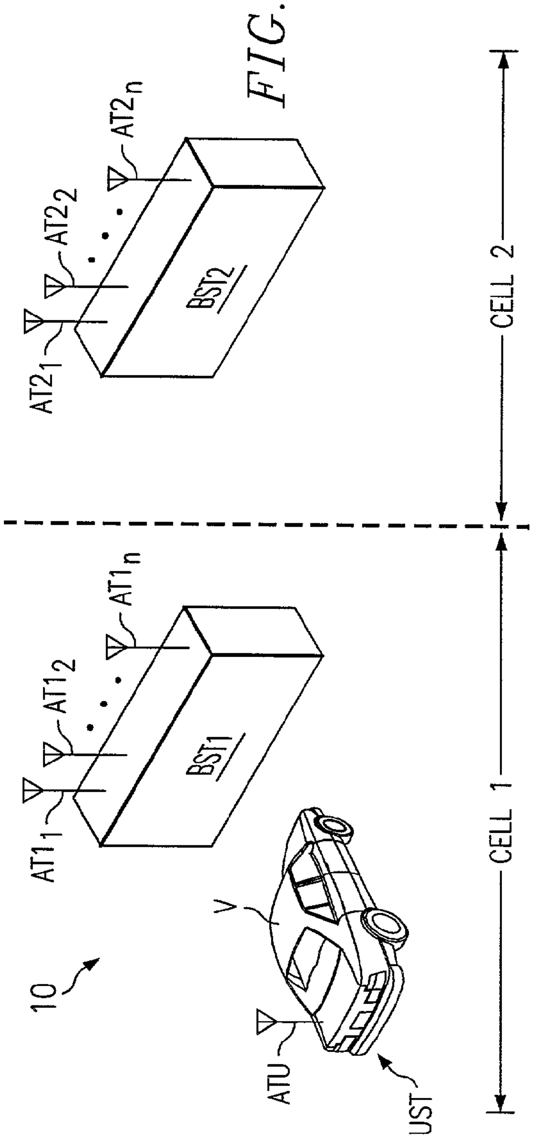
FIG. 1 illustrates a diagram of a cellular communications system by way of a contemporary code division multiple access ("CDMA") example in which the preferred embodiments operate.

FIG. 1 illustrates a diagram of a cellular communications system 10 by way of a contemporary code division multiple access ("CDMA") example in which the preferred embodiments operate. Within system 10 are shown two base stations BST1 and BST2. Each base station BST1 and BST2 includes a respective set of antennas AT$1_1$ through AT$1_n$ and AT$2_1$ through AT$2_n$ through which each may transmit or receive CDMA signals. The general area of intended reach of each base station defines a corresponding cell; thus, base station BST1 is intended to generally communicate with cellular devices within Cell 1 while base station BST2 is intended to generally communicate with cellular devices within Cell 2. Of course, some overlap between the communication reach of Cells 1 and 2 exists by design to support continuous communications should a communication station move from one cell to the other. Indeed, further in this regard, system 10 also includes a user station UST, which is shown in connection with a vehicle V to demonstrate that user station UST is mobile. In addition, by way of example user station UST includes a single antenna ATU for both transmitting and receiving cellular communications.

In some respects, system 10 may operate according to known general techniques for various types of cellular or other spread spectrum communications, including CDMA communications. Such general techniques are known in the art and include the commencement of a call from user station UST and the handling of that call by either or both of base stations BST1 and BST2. In order for either base station BST1 or BST2 to handle such a call, various signal processing is involved as is known in the art. For example, user station UST communicates a CDMA signal to a base station, where that CDMA communication is modulated by user station UST using a spreading code that consists of a series of binary pulses. Each piece of CDMA signal transmitted according to the spreading code is said to be a "chip." Thus, one station may communicate symbols to another station, and each symbol is spread with a number of these chips; the number of chips per symbol is referred to as the spreading factor. Also in this example, the devices in system 10 operate according to a given protocol for system 10, such as by way of example may be the IS-2000 standard which communicates at a 1.2288 MHz chip rate and whereby user station UST communicates at such a rate to base stations BST1 and BST2.

While FIG. 1 illustrates only a single user station UST for simplicity, the construction and operation of CDMA systems contemplates multiple user stations, where each user station is often mobile and therefore moves between cells. As such and by way of introduction, each base station BST1 and BST2 includes sufficient circuitry, as further detailed later, to receive signals from each of the different user stations and to distinguish those signals by performing correlations with respect to the codes, including the time shifting of those codes, as used by the transmitting user stations. These codes implement various levels of encoding, and may include so-called long codes and short codes as well as a Walsh code. In any event, each base station BST1 and BST2 includes sufficient receive circuitry to remove the effects of this encoding (i.e., decode or de-spread the signal) from signals received from another station so as to properly identify the information symbols within the communication.

Due to various factors including the fact that CDMA communications are along a wireless medium, an originally transmitted communication from a user station to a base station may arrive at a base station at multiple and different times. Each different arriving signal that is based on the same original communication is said to have a diversity with respect to other arriving signals originating from the same transmitted communication. One type of CDMA diversity that is addressed by circuitry in base station BST1 and BST2 occurs because a transmitted signal from the user station is reflected by objects such as the ground, mountains, buildings, and other things that it contacts. As a result, a same single transmitted communication may arrive at the receiver in a base station at numerous different times, and assuming that each such arrival is sufficiently separated in time, then each different arriving signal is said to travel along a different channel and arrive as a different "path." These multiple signals are referred to in the art as multiple paths or multipaths. Several multipaths may eventually arrive at the base station and the channel traveled by each may cause each path to have a different phase, amplitude, and signal-to-noise ratio ("SNR"). Accordingly, for one communication between one user station and one base station, each multipath is a replica of the same user information, and each path is said to have time diversity relative to other mulitpath(s) due to the difference in arrival time which causes different (uncorrelated) fading/noise characteristics for each multipath. Although multipaths carry the same user information to the receiver, they may be separately recognized by the receiver based on the timing of arrival of each multipath. More particularly, the chip rate in CDMA communications runs at a higher rate than the symbol data rate and determines the actual transmission bandwidth. Thus, the chip frequency defines the rate of the CDMA code. Given the use of transmission of the CDMA signal using chips, then multipaths separated in time by more than one of these chips are distinguishable at the receiver because of the low auto-correlations of CDMA codes as known in the art.

Various other types of diversity also may occur in CDMA communications, and the CDMA art strives to ultimately receive and process the originally transmitted data by exploiting the effects on each signal that are caused by the one or more diversities affecting the signal. Accordingly and as detailed further later, each base station BST1 and BST2 includes sufficient circuitry to receive signal paths from user stations, where with respect to selected diverse paths from a single user station those signals are assigned to base station circuitry commonly referred to in a general sense as RAKE circuitry. In general, RAKE circuitry separately processes each assigned path in an effort to identify the symbols in each path. Further, each base station BST1 and BST2 includes circuitry such that the separately identified streams of symbols from the RAKE circuitry are thereafter combined to exploit the diversity(ies) and thereby increase the likelihood that the symbols received in the various transmission paths are accurately identified.

Figure 2:
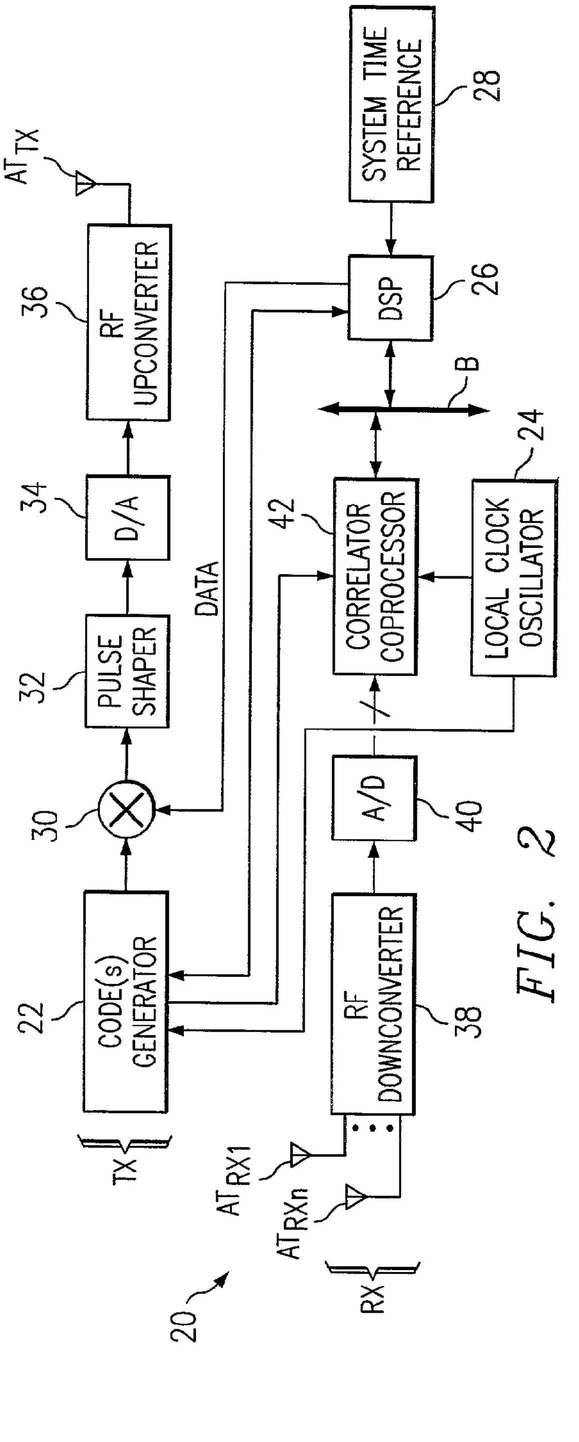
FIG. 2 illustrates an electrical block diagram of a base station configuration in accordance with the preferred embodiment and which may be used within either of base stations BST1 and BST2 in FIG. 1.

FIG. 2 illustrates an electrical block diagram of a base station configuration 20 in accordance with the preferred embodiment and which may be used within either or both of base stations BST1 and BST2 in system 10. By way of introduction, the illustration of base station configuration 20 only depicts various blocks to demonstrate the context and preferred implementation of one embodiment, while one skilled in the art should understand that numerous other blocks and related functionality may be included within base station configuration 20. Generally, base station configuration 20 includes one functional section illustrating transmit functionality TX and another functional section illustrating receive functionality RX. However, one skilled in the art should appreciate that FIG. 2 is primarily a functional block diagram and, thus, some circuits that implement certain functions may be common to both the TX and RX functionalities. Further, the discussion herein only notes certain preferred circuits and techniques for implementing certain aspects of the preferred embodiment, while still other aspects may be implemented within base station configuration 20. Lastly, the preferred embodiment as further detailed below relates more so to the receive functionality RX of configuration 20 and, thus, a lesser amount of detail is provided herein with respect to transmit functionality TX where additional details relating to such functionality may be ascertained by one skilled in the art.

Looking to the transmit functionality section TX of base station configuration 20, it includes a code(s) generator 22 which may generate various codes. For example and as introduced above, such codes may include short codes, long codes, Walsh codes (or other pseudo-noise ("PN") or other spreading codes), or a composite of more than one of these codes. Code(s) generator 22 is connected to operate in response to a local clock oscillator 24 that provides a local master clock signal that defines, among other things, the chip rate which in a common example is 1.2288 MHz. Although not exhaustively shown, local clock oscillator 24 also provides a master clock signal to much of the circuitry of base station configuration 20, some of which is further discussed below. Returning to code(s) generator 22, the code or composite code it generates also may be affected in response to signals from a digital signal processor ("DSP") 26. Also with respect to DSP 26 and its potential effect on the codes, DSP 26 receives one or more signals from a System Time reference 28. In one embodiment, System Time reference 28 includes signals received from a global position satellite ("GPS") receiver (not separately shown), where additional details of this embodiment may be found in U.S. patent application Ser. No. 10/174,376, entitled "Wireless Communication System Operating In Response In Part To Time Signals From The Global Position Satellite System", filed Jun. 18, 2002, and hereby incorporated herein by reference. Returning to code(s) generator 22, it outputs a code or composite code that is connected as a multiplicand input to a multiplier 30, where multiplier 30 also receives DATA from DSP 26 as a multiplicand input. The product output of multiplier 30 is connected as an input to a pulse shaper 32, and the output of pulse shaper 32 is connected as a digital input to digital-to-analog ("D/A") converter 34. Finally, the analog output of D/A converter 34 is connected to an RF upconverter circuit 36 that couples its RF output to a transmit antenna $AT_{TX}$. Although only one transmit antenna $AT_{TX}$ is shown, it should be understood and as mentioned above with respect to FIG. 1 that a base station, and hence base station configuration 20, may include multiple transmit antennas.

The operation of the transmit functionality section TX of base station configuration 20 is now described. Preferably, local clock oscillator 24 provides a free running dock signal, that is, it is not driven by or locked to any external source. This free running clock signal is connected to code(s) generator 22 and, in response, generator 22 outputs a code or a composite code as a multiplicand to multiplier 30. Additionally, DSP 26 outputs digital DATA to be transmitted to another station, and multiplier 30 multiplies that DATA by the code with the result being provided to pulse shaper 32. Phase shaper 32 converts the digital signal to any one of various desired transmission formats as known in the art, such as a raised cosine signal. Finally and as known in the art, D/A converter 34 converts the formatted digital signal to an analog form and radio frequency upconverter 36 converts the analog signal into a radio frequency format that is then transmitted via transmit antenna $AT_{TX}$ so that those radio frequency communications may be received by other stations such as user station UST shown in FIG. 1.

Looking to the receive functionality section RX of base station configuration 20, it includes a number of antennas $AT_{RX1}$ through $AT_{RXn}$, where in the preferred embodiment n=18, that is, 18 receive antennas are included. Receive antennas $AT_{RX1}$ through $AT_{RXn}$ receive signals and connect them to an input of an RF downconverter 38. The analog output of RF downconverter 38 is connected as an input to an analog-to-digital ("A/D") converter 40 that has its output connected as an input to a correlator coprocessor 42. Preferably, correlator coprocessor 42 is constructed as an application specific integrated circuit ("ASIC"), and in future implementations it may be integrated with other devices, most notably DSP 26. Correlator coprocessor 42 operates in cycles generally in response to the master clock signal provided by local dock oscillator 24. Further in this respect, in the preferred embodiment local clock oscillator 24 provides four different clocks to correlator coprocessor 42, the first being the master clock signal (e.g., 1.2288 MHz) described above, while the other three are multiples of the master dock signal. Specifically, in the preferred embodiment, correlator coprocessor 42 also receives multiples of 8 times, 64 times, and 128 times the master clock signal, each of which must be synchronous and phase aligned. Correlator coprocessor 42, and hence the contents of various of its buffers discussed below, is bi-directionally coupled to a bus B. Bus B is also bi-directionally coupled to DSP 26, such as through one or more external memory interfaces of DSP 26 where multiple interfaces provide the benefit of different data bus size accesses (e.g., 16-bit and 32-bit). Thus, DSP 26 has access through these connections to the data in the buffers of correlator coprocessor 42. Further, having introduced DSP 26 earlier, it is now noted that in the preferred embodiment DSP 26 is selected from the family of DSP devices commercially available from Texas Instruments Incorporated, with the preferred selection currently being the TMS340C642x DSP. As detailed below, DSP 26 operates in various respects, but in one respect that is particularly discussed in the preferred embodiment DSP 26 provides instructions to an instruction task buffer in correlator coprocessor 42 (via bus B) to provide a highly flexible receiver functionality as further appreciated below.

The operation of the receive functionality section RX of base station configuration 20 is now described generally, with greater details presented throughout the remainder of this document with respect to certain aspects of the preferred embodiment. Radio frequency signals are received by receive antennas $AT_{RX1}$ through $AT_{RXn}$, downconverted by RF downconverter 38, and converted from analog to digital signals by A/D converter 40, all as known in the art. In the preferred embodiment, the digital signals from A/D converter 40 are sampled at eight times the chip rate and in response to the above-mentioned clock signal which is eight times the master clock (which provides the chip rate). The digital resulting signals are passed to correlator coprocessor 42 which selects from these digital signals and performs numerous functional operations. In the preferred embodiment the signals are maintained in correlator coprocessor 42 in a manner to correspond to the antenna from which they were received so that finger operations may be made with respect to a specific signal selected as corresponding to a given one of receive antennas $AT_{RX1}$ through $AT_{RXn}$. Indeed, in the preferred embodiment correlator coprocessor 42 is a programmable, highly flexible, vector-based correlation machine that performs CDMA base-station RAKE receiver operations on signals selected from one of antennas $AT_{RX1}$ through $AT_{RXn}$. Such RAKE receiver functions involve finger de-spreading (complex values) which consist of PN-multiply as well as different types of accumulations, as further detailed later. Briefly by way of introduction, these accumulations include coherent accumulations for determining pilot and/or non-pilot symbols, as well as both coherent and optional non-coherent accumulations to represent either non-pilot or pilot energy values based on the early, on-time, and late samples of a RAKE finger. Additionally correlator coprocessor 42 performs CDMA search operations, where such operations are not detailed extensively herein as they are not a focus of the preferred embodiments and various alternatives may be implemented with respect to the search function without departing from the intended inventive scope. Lastly, still additional details with respect to the functionality of correlator coprocessor 42 may be found in the following U.S. patent applications, each of which is hereby incorporated herein by reference: (1) U.S. patent application Ser. No. 09/244,518, filed Feb. 4, 1999; (2) U.S. patent application Ser. No. 09/607,410, filed Jun. 30, 2000; and (3) U.S. patent application Ser. No. 09/691,576, filed Oct. 18, 2000. The results of processing operations from correlator coprocessor 42 are coupled to bus B, and using those results DSP 26 performs additional signal processing. For example, DSP 26 preferably performs symbol rate receive operations such as channel estimation (including phase and frequency estimation), maximal ratio combining ("MRC") in RC 3&4, de-interleaving, automatic gain control, and automatic frequency control. Thus, DSP 26 is able to ultimately detect the received data symbols, and those symbols may be processed in various desirable manners based on the intended functionality of base station configuration 20. Indeed, typically those symbols provoke additional transmissions in the form of DATA output by DSP 26 to multiplier 30 as discussed above with respect to the transmit functionality section TX of base station configuration 20.

Figures 3, 5:
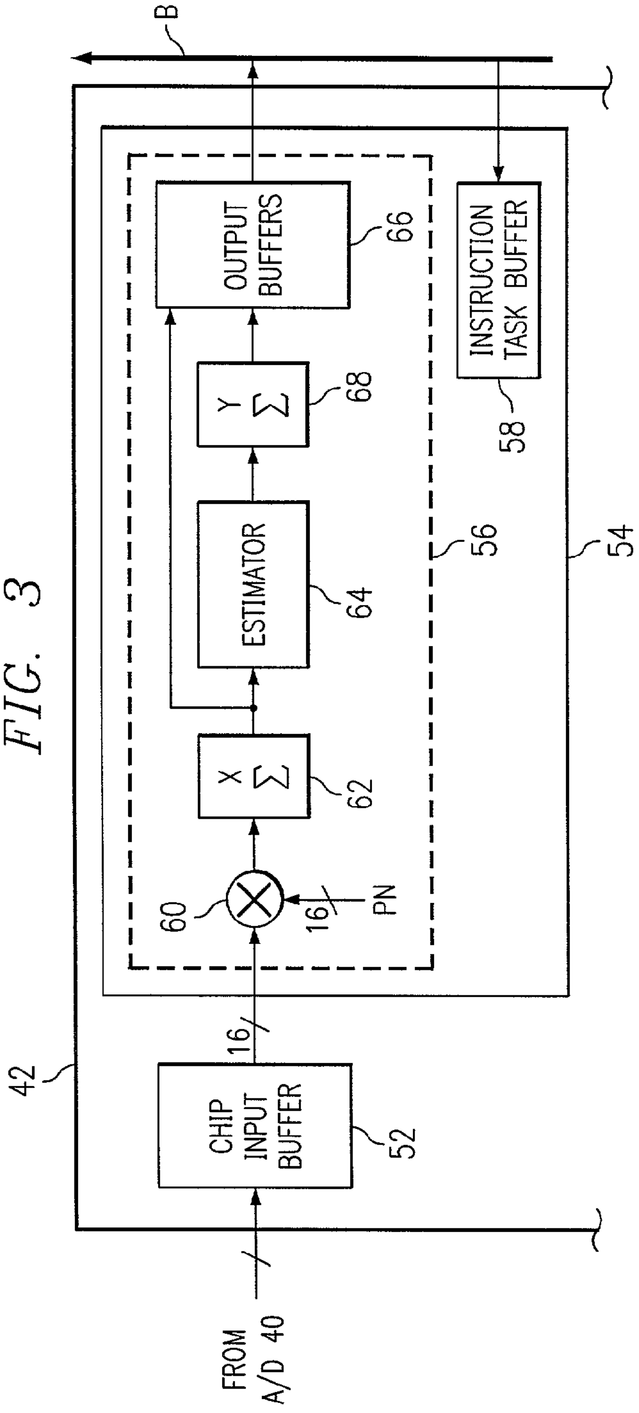
FIG. 3 illustrates a functional block diagram of a portion of the correlator coprocessor of FIG. 2 according to the preferred embodiment.
FIG. 5 illustrates a Walsh table according to the preferred embodiment.

FIG. 3 illustrates a functional block diagram of a portion of correlator coprocessor 42 according to the preferred embodiment. Within correlator coprocessor 42 is shown a chip input buffer 52 that receives chips from the output of A/D converter 40. In the preferred embodiment, chip input buffer 52 is sized to store up to eight time separated samples of 48 chips per antenna (e.g., 18 antennas) and, thus, the buffer may be thought of as having a different buffer for each different antenna (e.g., 18 buffers). Thus, each buffer stores eight samples of each of 48 chips provided by its respective antenna, where this eight times sampling rate is provided by the above-mentioned input to correlator coprocessor 42 of a clock signal that is eight times the master clock signal. The output of chip input buffer 52 is connected to a RAKE receiver 54. Thus, with respect to each chip as represented by eight samples in chip input buffer 52, any one of those samples per chip may be selected for processing by RAKE receiver 54. As further detailed below, RAKE receiver 54 processes 16 of these samples (i.e., it processes 16 chips) at a time from chip input buffer 52. In the preferred embodiment, RAKE receiver 54 includes a single finger data path 56 with various circuitry as detailed below. By way of introduction, some of the circuitry in single finger data path 56 is programmable in response to different parameters so that path 56 achieves different operations based on corresponding instructions received in an instruction task buffer 58, where these instructions are provided by DSP 26 via bus B. For the sake of reference in this document, for each instruction, the configuration and operations performed in single finger data path 56 and in response to that instruction are referred to as a finger task. Still other details relating to a RAKE receiver with a single data path may be found in the above-incorporated U.S. patent application Ser. No. 09/244,518.

Looking to the specific circuitry preferably within single finger data path 56, the output of chip input buffer 52 connects 16 chips as a first multiplicand to a multiplier 60, and multiplier 60 receives as a second multiplicand a 16 chip PN code. The 16 chip PN code may be based on various different codes depending on the mode of operation as detailed below, but by way of introduction note therefore that the PN code may be based on one or more of a short code, a long code, and another spreading code such as a Walsh code. In any event, the operation of multiplier 60 performs a de-spreading effect that therefore produces complex symbols (I&Q) by multiplying the set of chips from chip input buffer 52 times the appropriate codes (e.g., short code, long code, and Walsh code). The de-spreading is OQPSK for RC 1&2, and to facilitate the OQPSK both a first set of on-time chip samples are accessed from input buffer 52 followed by a second set of late samples corresponding to a time ½ chip after respective chips in the first set. The de-spreading is QPSK for RC 3&4. The de-spread product output of multiplier 60 is connected as an input to a coherent accumulator 62, designated as coherent since it receives chips representing both the real and imaginary values arising from the I and Q symbol constellation. Accumulator 62 is operable to accumulate X samples, where the value of X is programmable in response to the corresponding instruction in instruction task buffer 58 as further detailed below. The output of accumulator 62 is connected as an input to an estimator circuit 64, where estimator circuit 64 is operable to provide an estimate of $I^2+Q^2$. Note that an estimate of this value is preferable over an actual multiplication circuit in that the latter would be considerably detailed to achieve the necessary complex multiplication. The output of accumulator 62 is also connected to a group of output buffers 66 which, as detailed below, include various different buffers for storing different types of outputs from the circuitry in finger data path 56, where the different types also depend on the programmability in response to the corresponding instruction in instruction task buffer 58. The output of estimator circuit 64 is connected as an input to an accumulator 68, where accumulator 68 is operable to accumulate Y samples, and the value of Y is programmable in response to the corresponding instruction in instruction task buffer 58. The output of accumulator 68 also is connected to output buffers 66. Finally, the buffers in output buffers 66 are connected to bus B, so for example the values in those buffers may be read by DSP 26 (see FIG. 2) via bus B. Thereafter, DSP 26 may perform additional operations with respect to that information.

Figure 4:
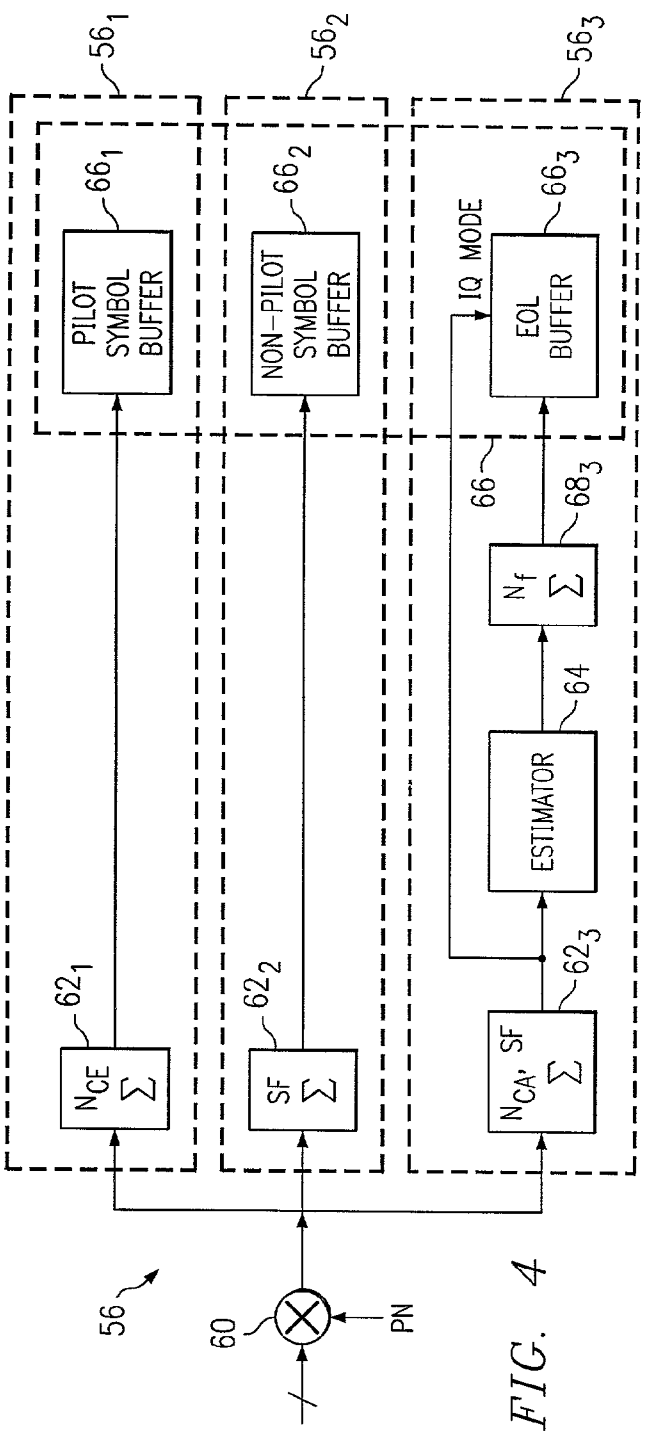
FIG. 4 illustrates the single finger data path from FIG. 3 and which is re-drawn in functional form to depict three alternative functionalities.

Additional operations of correlator coprocessor 42 of FIG. 3 are explored in various details later, and to better present that discussion single finger data path 56 from FIG. 3 is re-drawn in functional form in FIG. 4. Specifically, recall it is noted above that accumulators 62 and 68 are both programmable in response to a corresponding instruction in instruction task buffer 58. Further in this regard, FIG. 4 illustrates that such programmability affects the functionality of single finger data path 56 in response to different instructions so that path 56 operates in different functional manners during different cycles, and those different manners may be separated in a functional sense into three different paths, shown as paths $\mathbf{56}_1$, $\mathbf{56}_2$, and $\mathbf{56}_3$ in FIG. 4. In order to better demonstrate the functions of these paths and for reasons further appreciated below, the functional paths are identified in the remaining discussion as pilot symbol path $\mathbf{56}_1$, non-pilot symbol path $\mathbf{56}_2$, and early, on-time, or late ("EOL"; E=early, O=on time, L=late) path $\mathbf{56}_3$. Each of these functional paths is described below.

Pilot symbol path $\mathbf{56}_1$ receives the product output of multiplier 60 into an accumulator $\mathbf{62}_1$. Accumulator $\mathbf{62}_1$ represents what is shown as accumulator 62 in FIG. 3, but in the case of FIG. 4 that accumulator forms part of the function of pilot symbol path $\mathbf{56}_1$ and the value of X is instead represented by a parameter $N_{CE}$. The output of accumulator $\mathbf{62}_1$ is connected as an input to a pilot symbol buffer $\mathbf{66}_1$ that is part of output buffers 66.

Non-pilot symbol path $\mathbf{56}_2$ receives the product output of multiplier 60 into an accumulator $\mathbf{62}_2$. Accumulator $\mathbf{62}_2$ represents what is shown as accumulator 62 in FIG. 3, but in the case of FIG. 4 that accumulator forms part of the function of non-pilot symbol path $\mathbf{56}_2$ and the value of X is instead represented by a parameter SF. The output of accumulator $\mathbf{62}_2$ is connected as an input to a non-pilot symbol buffer $\mathbf{66}_2$ that is part of output buffers 66.

EOL path $\mathbf{56}_3$ receives the product output of multiplier 60 into an accumulator $\mathbf{62}_3$. Accumulator $\mathbf{62}_3$ represents what is shown as accumulator 62 in FIG. 3, but in the case of FIG. 4 that accumulator forms part of the function of EOL path $\mathbf{56}_3$ and the value of X is instead represented by either a parameter $N_{CA}$ or a parameter SF, where one or the other is selected in a given cycle as described later. The output of accumulator $\mathbf{62}_3$ is connected as an input to an EOL buffer $\mathbf{66}_3$ that is part of output buffers 66. In addition, the output of accumulator $\mathbf{62}_3$ is connected as an input to estimator 64 (discussed above in connection with FIG. 3), and the output of estimator 64 is connected as an input to an accumulator $\mathbf{68}_3$. Accumulator $\mathbf{68}_3$ represents what is shown as accumulator 68 in FIG. 3, but in the case of FIG. 4 that accumulator forms part of the function of EOL path $\mathbf{56}_3$ and the value of Y is instead represented by a parameter $N_f$. The output of accumulator $\mathbf{68}_3$ is also connected as an input to EOL buffer $\mathbf{66}_3$.

A detailed discussion of the operation of each of the functional paths $\mathbf{56}_1$, $\mathbf{56}_2$, and $\mathbf{56}_3$ in connection with RAKE receiver 54 is provided below, and for further introduction of such operation some more general observations are now discussed. Generally, correlator coprocessor 42 is operable to perform one iteration on 16 chips from chip input buffer 52; however, RAKE receiver 54, including its single data path 56, is clocked so that it performs 1,024 cycles during that single iteration. Specifically, finger data path 56 runs at 64 times the chip rate, where this 64 times the chip rate is provided by the above-mentioned input to correlator coprocessor 42 of a clock signal that is 64 times the master dock signal. This allows 1,024 cycles in a 16 chip period (i.e., 64 cycles*16 chips=1,024). For each of these dock cycles, therefore, single data path 56 may operate toward achieving any one of the functions illustrated by functional paths $\mathbf{56}_1$, $\mathbf{56}_2$, and $\mathbf{56}_3$. The specific number of cycles required depends on which of paths $\mathbf{56}_1$, $\mathbf{56}_2$, and $\mathbf{56}_3$ is functionally occurring, and the configuration of single data path 56 into each of these different paths at different times is in response to an instruction in instruction task buffer 58 as well as whether the operation is occurring under the RC 3&4 mode or the RC 1&2 mode, where recall that both modes are preferably supported by the preferred embodiment. The format of instructions submitted to instruction task buffer 58 is described later, with the resulting functionality being mostly explained first in connection with the already-introduced Figures. Also, the functionality of single data path 56 in the RC 1&2 mode is generally a subset of the functionality of the RC 3&4 mode and, for this reason, the following discussion focuses primarily on the RC 3&4 mode to demonstrate the full functionality with some concluding remarks about the subset of that functionality as available during the RC 1&2 mode.

The functionality of pilot symbol path $\mathbf{56}_1$ in the RC 3&4 mode and as part of the operation of correlator coprocessor 42 is now explored. As its name implies, pilot symbol path $\mathbf{56}_1$ operates to process a group of chips and to provide an appropriate number of decoded pilot symbols from those chips. Specifically, for a given cycle of operation, chip input buffer 52 is controlled to output 16 chips to multiplier 60, where the 16 chips are selected from a user station transmission received by one of the 18 receive antennas on base station configuration 20. In the preferred embodiment, pilot symbols transmitted by user station UST are spread only with a short and long code, that is, no Walsh code is imposed on those symbols (which is sometimes referred to as the use of a zero Walsh code). Thus, the PN multiplicand to multiplier 60 only reflects the short and long code, with the appropriate time shifting of that code corresponding to the user station UST which transmitted the signal including the chips to base station configuration 20. The 16 chip product from multiplier 60 is connected as an input to accumulator $\mathbf{62}_1$. Accumulator $\mathbf{62}_1$ next accumulates $N_{CE}$ chips samples as received from multiplier 60. As further detailed below, the value of $N_{CE}$ is provided by the instruction in instruction task buffer 58 which gives rise to the pilot symbol processing through pilot symbol path $\mathbf{56}_1$. In any event, the parameter $N_{CE}$ preferably represents the number of chips that represent a single pilot symbol and, thus, accumulator $\mathbf{62}_1$ accumulates a total of these chips. In the preferred embodiment, $N_{CE}$ is one of four values, namely, 64, 128, 192, or 384. The power control bit ("PCB") is also de-spread the same amount as specified by $N_{CE}$. Further, therefore, since each iteration of correlator coprocessor 42 processes 16 chips, then it may be appreciated that multiple iterations are required to accumulate a sufficient number of chips in pilot symbol path $\mathbf{56}_1$. For example, if $N_{CE}$=64, then a total of four iterations (i.e., 16 chips/iteration*4 iterations=64 chips) are required for accumulator $\mathbf{62}_1$ to accumulate the total of $N_{CE}$=64 chips. Once the $N_{CE}$ chips are accumulated, accumulator $62_1$ outputs the resulting pilot symbol to pilot symbol buffer $66_1$. From that point, that pilot symbol is available, via bus B, to DSP 26 for further processing, and this availability may be indicated by an event comparable to interrupt processing as further discussed later.

The functionality of non-pilot symbol path $56_2$ in the RC 3&4 mode as part of the operation of correlator coprocessor 42 is now explored. As its name implies, non-pilot symbol path $56_2$ operates to process a group of chips and to provide an appropriate number of decoded non-pilot symbols from those chips; in some instances, such non-pilot symbols are referred to simply as data symbols, but such terminology may cause confusion and thus the endeavor herein is to avoid this alternative phrase. Generally, the input is the same as for pilot symbols, that is, for a given cycle of operation chip input buffer 52 is controlled to output 16 chips to multiplier 60, where the 16 chips are selected from a user station transmission received by one of the 18 receive antennas on base station configuration 20. In the case of non-pilot chips, however, they are transmitted by user station UST after being spread with a short and/or long code as well as an additional spreading code such as a Walsh code. Thus, the PN multiplicand to multiplier 60 reflects a composite code including the Walsh code as well as the short code and/or long code, with the appropriate time shifting of that composite code corresponding to the user station UST which transmitted the signal including the chips to base station configuration 20. The 16 chip product from multiplier 60 is connected to accumulator $62_2$. Accumulator $62_2$ next accumulates SF chips samples as received from multiplier 60. The parameter SF is the spreading factor used in the transmission which, as known in the art, indicates the number of spreading chips per symbol for the given communication; thus, accumulator $62_2$ accumulates a total of these chips. In the preferred embodiment, SF as used by accumulator $62_2$, as well as the Walsh code input to multiplier 60 during the same cycle, are specified in a table referred to as a "Walsh table" and identified by the corresponding instruction in instruction task buffer 58 as detailed later in connection with FIG. 5. In any event, typically SF equals 16 or less. Thus, in a single clock cycle, and recalling that 16 chips are input to RAKE receiver 54 per cycle, accumulator $62_2$ accumulates a sufficient number of chips corresponding to at least one or more non-pilot symbols. For example, if SF=2 (i.e., 2 chips per symbol), then in a single cycle a total of eight non-pilot symbols may be accumulated (i.e., 16 chips/iteration*1 symbol/2 chips=8 symbols). If the SF is greater than 16, then the partial correlation result is written to coherent scratch memory (not expressly shown) for further accumulation. Thus, a total of SF/16 iterations are required to complete the symbol length correlation. In any event, once the SF chips are accumulated, accumulator $62_2$ outputs the resulting non-pilot symbol(s) to non-pilot symbol buffer $66_2$. From that point, the non-pilot symbol(s) is available, via bus B, to DSP 26 for further processing, and this availability may be indicated by an event comparable to interrupt processing.

Having described the functionality of non-pilot symbol path $56_2$ in the RC 3&4 mode, additional aspects of that path $56_2$ are now presented and which also facilitate a discussion of the functionality of EOL path $56_3$ in the RC 3&4 mode. In this regard, FIG. 5 illustrates a Walsh table 70 where recall that various parameters in connection with the functionality of non-pilot symbol path $56_2$ are obtained from such a table. In the preferred embodiment, DSP 26 is responsible for creating Walsh table 70, and it does this based on how many channels each user has and what type of EOL processing is required for each user. Walsh table 70 is preferably stored in a memory, register, or the like in correlator coprocessor 42, where the location of the beginning of the table is indicated by a pointer in the corresponding instruction in instruction task buffer 58 as also detailed later. Preferably, Walsh table 70 stores a number of entries where, in the preferred embodiment, up to four entries may be stored. Each entry provides parameters for a single cycle of operation of single data path 56. Moreover, since each Walsh table 70 is accessed in response to a "task" that is instigated by a corresponding single instruction, then each cycle of operation in response to a table entry is referred to herein as a "sub-task." The first entry in Walsh table 70, illustrated for sake of reference in FIG. 5 as ENTRY 1, may be one of two different types of entries: (1) a Walsh subtask; or (2) an EOL sub-task. Any later ENTRY in Walsh table 70 may include only an additional corresponding Walsh sub-task, as shown by way of example in ENTRIES 2 through 4 in FIG. 4. Each of the Walsh sub-task and the EOL sub-task is further described below.

Figure 6:
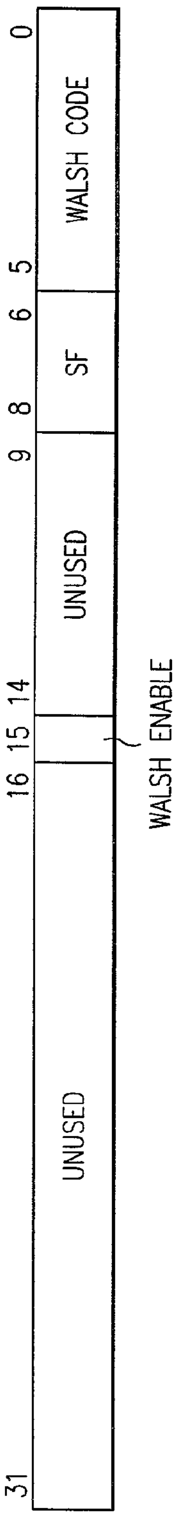
FIG. 6 illustrates the preferred format of a Walsh sub-task entry which is stored as a 32 bit value in the Walsh table of FIG. 5.

A Walsh sub-task entry in Walsh table 70 is performed by non-pilot symbol path $56_2$ as described above, that is, with the operation of accumulator $56_2$ to accumulate SF chip products from multiplier 60 and with the result stored in non-pilot symbol buffer $66_2$. To illustrate this operation still further, FIG. 6 illustrates the preferred format of a Walsh sub-task entry which is stored as a 32 bit value. Looking then to FIG. 6, bit 15 is a Walsh enable bit that, when set (e.g., equal to 1), directs (i.e., enables) single finger data path 56 to operate in the corresponding cycle to perform the functionality of non-pilot symbol path $56_2$, whereas if the Walsh enable bit is not set then single finger data path 56 does not operate for the corresponding cycle. Moreover, when the Walsh enable bit is set to enable a non-pilot operation, then bits 5:0 provide a Walsh code number ranging between 0 and 63 that provides the Walsh code to be used in the PN composite code input to multiplier 60, and bits 8:6 provide the spreading factor, SF, as determined by $2^{(SF+1)}$, for the number of chip products to be accumulated by accumulator $62_2$. Various bits in the sub-task entry in FIG. 5, as well as bits in other aspects detailed below, are indicated as "unused" in that under the presently contemplated embodiment these bits are reserved for future possible modifications as may be ascertained by one skilled in the art. Lastly, note also that in the preferred embodiment a Walsh sub-task entry in Walsh table 70 is used to accomplish the functionality of pilot symbol path $56_1$ as described above, where in this case of pilot symbols the Walsh sub-task specifies the zero Walsh code since no Walsh code is implemented with respect to the pilot symbols.

Figure 7:
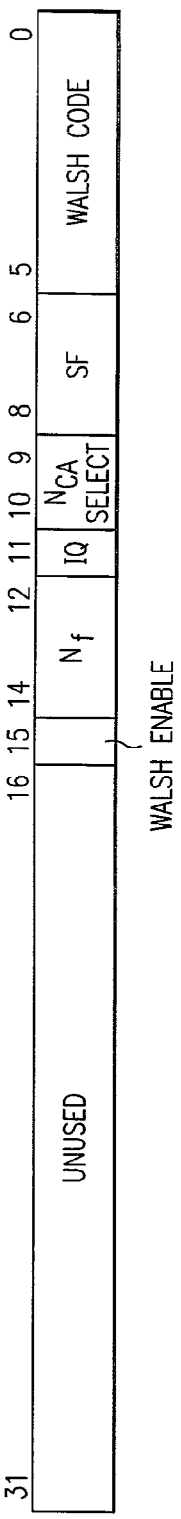
FIG. 7 illustrates the preferred format of an EOL sub-task entry which also is stored as a 32 bit value in the Walsh table of FIG. 5.

An EOL sub-task entry in Walsh table 70 is performed by EOL path $56_3$ in FIG. 4. In the preferred embodiment, the EOL operations may be made with respect to determine an EOL measure regarding either pilot or non-pilot symbols. To further illustrate this operation, FIG. 7 illustrates the preferred format of an EOL sub-task entry which also is stored as a 32 bit value. Looking then to FIG. 7, bits 15, 5:0 and 8:6 are the same as in FIG. 6 and are used when path $56_3$ determines an EOL measure with respect to non-pilot symbols. Thus, in this case bit 15 enables the cycle operation, the Walsh code indicated by bits 5:0 is used as part of the PN composite code multiplicand of multiplier 60, and bits 8:6 specify the spreading factor $2^{(SF+1)}$ used by accumulator $62_3$, where the resulting accumulation is output to EOL buffer $66_3$; also during this operation the $N_{CA}$ select in bits 10:9 are disregarded. Conversely, when path $56_3$ determines an EOL measure with respect to pilot symbols, then no Walsh code is included in the composite code multiplicand of multiplier 60, and the $N_{CA}$ select in bits 10:9 specify the number of product chips accumulated by accumulator $\mathbf{62}_3$, where preferably those two bits map as 00 to 128, 01 to 384, 10 to 768, and 11 to 1152; also during this operation the bits 8:6 and 5:0 are disregarded. Note further with respect to EOL measures on pilot symbols that two different modes of accumulated chips are available, referred to as the IQ mode and the energy mode. The selection of these modes is established by the IQ bit located at bit 11. Specifically, if the IQ bit is set, then the IQ mode is selected meaning the coherent accumulation of the $N_{CA}$ pilot symbols are output directly from accumulator $\mathbf{62}_3$ to EOL buffer $\mathbf{66}_3$. On the other hand, if the IQ bit is not set, then the energy mode is selected and the coherent accumulation of the $N_{CA}$ pilot symbols are passed from accumulator $\mathbf{62}_3$ to estimator 64 which, as discussed above, estimates the value $I^2+Q^2$. This estimated value is passed to accumulator $\mathbf{68}_3$ which performs a non-coherent accumulation on a number of values spanning $N_f$ frames, where the parameter $N_f$ is provided by bits 14:12 in the EOL sub-task entry. Once those $N_f$ frames of energy estimates are accumulated, they are output from non-coherent accumulator $\mathbf{68}_3$ to EOL buffer $\mathbf{66}_3$. Note also that the EOL nature of path $\mathbf{56}_3$ is such that different cycles are used for different sets of early, on-time, and late samples of the same group of 16 chips being output to RAKE receiver 54 from chip input buffer 52. In the preferred embodiment, therefore, three such cycles are required to perform the early, on-time, and late processing with respect to pilot chips and four such cycles are required to perform the early, on-time, and late processing with respect to non-pilot chips. There are 4 cycles because the EOL processing is done on the pilot channel; and additional cycle is required to process the data channel. Lastly, in the preferred embodiment the actual difference in time between the early, on-time, and late sets of samples taken from the group of 16 chips is programmable by writing that value into a register (not expressly shown) in RAKE receiver 54.

The preceding demonstrates the operation of single finger data path 56 within RAKE receiver 54, and from that discussion one skilled in the art may readily ascertain various benefits of this operation, particularly as that single path may be configured for different cycles to operate as any of functional paths $\mathbf{56}_1$, $\mathbf{56}_2$, and $\mathbf{56}_3$. For example, by operating with respect to 16 chips at a time and with up to 1,024 cycles of operation on those 16 chips, various different types of operations may be achieved with the architecture illustrated and without requiring physically duplicated finger circuit paths as are often implemented in the prior art. As another example, different instructions may point to the same Walsh table, such as would be preferable to process different signals (i.e., different sets of chips) corresponding to a same user. As a result, the information in the Walsh table (e.g., different Walsh codes or different SF values) also need not be duplicated for multiple finger circuits as are often implemented in the prior art. As yet another example, the use of an instruction, as further detailed below, to effectively configure the single finger data path 56 into one of three different functional paths in a given cycle provides a considerable amount of programming and operating flexibility, that is, there are a number of different ways that its resources can be divided to perform RAKE functions.

Given the preceding, one skilled in the art should appreciate that single finger data path 56 may multitask in the sense of processing up to K finger tasks in a single iteration, that is, within the 1,024 clocks permitted for processing a same set of 16 chips. By way of an example, assume that K equals eight and assume at a given time that base station configuration 20 is receiving four multipaths from a user station A and four multipaths from a user station B. Thus, using the single physical structure of data path 56, four finger tasks may be assigned to process the chips of four multipaths from user station A so that in a first instance the single physical data path processes the chips of a first multipath from user station A, followed by a second instance wherein the single physical data path processes the chips of a second multipath from user station A, followed by a third instance wherein the single physical data path processes the chips of a third multipath from user station A, and finally followed by a fourth instance wherein the single physical data path processes the chips of a fourth multipath from user station A. Each of the first through fourth instances therefore represent respective first through fourth finger tasks. Similarly, four additional instances of operation of the single data path are incurred to process the four multipaths from user station B, with each of these additional instances being referred to as four additional and different finger tasks.

Having detailed the various functionality of functional paths $\mathbf{56}_1$, $\mathbf{56}_2$, and $\mathbf{56}_3$ in connection with the RC 3&4 mode, recall now that in the preferred embodiment the functionality provided by single finger path 56 in the RC 1&2 mode is generally a subset of that in the RC 3&4 mode. Also, the path functionality of the RC 1&2 mode is generally a subset of the path functionality of the RC 3&4. Specifically, the RC 1&2 mode operations have the following differences from the operations with respect to RC 3&4. As one difference, there is no use of path $\mathbf{56}_1$ for the RC 1&2 mode, that is, there is no de-spread and accumulation of pilot symbols. As another difference, the RC 1&2 mode as known in the art does not spread its communications with a Walsh code; thus, in RAKE receiver 54 there is no use of a Walsh code in the PN input to multiplier 60. As another difference, the accumulation value of SF used by accumulator $\mathbf{62}_2$ for purposes of accumulating non-pilot symbols and the accumulation value of SF used by accumulator $\mathbf{62}_3$ for purposes of accumulating EOL are both fixed at four, whereas SF is programmable for the RC 3&4 mode. As another difference, there is no energy mode for the RC 1&2 mode and, thus, there is no functionality as shown with respect to estimator 64 and accumulator $\mathbf{68}_3$ as are available in connection with the RC 3&4 mode. Lastly, as known in the art, RC 1&2 communications are typically communicated using OQPSK modulation, which for de-modulation requires a sample at one chip time followed by another sample one-half chip time later. As a result, path $\mathbf{56}_2$ is operable to accommodate the OQPSK de-modulation functionality according to this dual chip time modulation approach.

FIG. 8 illustrates the preferred format of a 128-bit instruction to be written by DSP 26 to instruction task buffer 58 of correlator coprocessor 42 as detailed above, and for consequently causing the various RC 3&4 mode task operations described above and according to the preferred embodiment. For the sake of illustration, the 128-bit instruction is divided into four 32-bit words identified in FIG. 8 as Finger_Task_w0 through Finger_Task_w3. The various values stored in the bits of those words are now described, where considerable detail is assumed to be understood by the reader based on the numerous functions described earlier with respect to FIGS. 1 through 7.

Looking to the least significant bits in Finger_Task_w0, bits 15:14 are the instruction opcode, meaning the value of those two bits are interpreted by correlator coprocessor 42 as an indication on how to interpret the remaining bits in the instruction for purposes of the present task that will process 16 chips from chip input buffer 52. For an RC 3&4 mode instruction these opcode bits equal 00. Bits 13:11 identify which of the eight samples is taken from each of the 16 chips output by input buffer 52. Bits 10:9 identify the number of chips to be accumulated by accumulator $\mathbf{62}_1$ so that the result provides one or more pilot symbols to pilot symbol buffer $\mathbf{66}_1$. Bits 7:6 are a system parameter that specifies a time skewing of data channel frames relative to a System Time defined in the RC 3&4 standard in integer multiples of one power control group=1.25 ms; this value therefore may inform correlator coprocessor 42 that a change has been made relative to its local time, where these bits provide an option of no change or plus or minus a delta where delta is a sub-sample of a chip. Bits 5:0 identify one of the N user stations that is communicating with base station configuration 20. This value is usable as an index to determine the appropriate shifting of the long code for that user and it is also usable to track an appropriate output location in buffers 66 to store processed symbols or EOL measures relating to that user.

Looking to the most significant bits in Finger_Task_w0, bit 28 indicates whether EOL path $\mathbf{56}_3$ operates with respect to either non-pilot symbols (bit set to 1) or pilot symbols (bit set to 0). Bits 27:21 point to a Walsh table, such as shown by way of example as Walsh table 70 in FIG. 5. Bits 20:19 are an $N_{Walsh}$ number that indicates the number of entries in the identified Walsh table to be processed, up to a maximum of four entries. However, recall also from FIGS. 5 and 6 that each Walsh table ENTRY has a Walsh enable bit (i.e., bit 15) which if set to disable causes no accumulation to happen for the cycle corresponding to that entry. Thus, even if the $N_{Walsh}$ bits 20:19 in Finger_Task_w1 include an ENTRY, that entry may in effect cause a no operation during the cycle in which it is examined if the Walsh enable bit in that ENTRY is set to disable. However, note that in this case a cycle is expended, so in the instance where minimizing cycle usage is desired, a more optimal programming approach is to set the value of the $N_{Walsh}$ bits 20:19 to only identify the number of ENTRIES in the Walsh table that have respective Walsh enable bits set to enable the ENTRY. Bit 18 enables an EOL cycle for the first ENTRY in the present Walsh table pointed to by bits 27:21. More particularly, recall from the earlier discussion of FIG. 5 that the top ENTRY in a Walsh table is optionally either a Walsh sub-task or an EOL sub-task, and note now that bit 18 in FIG. 8 indicates to correlator coprocessor 42 which of the two types of sub-tasks is located as that top ENTRY. In the preferred embodiment, if bit 18 in Finger_Task_w1 is 1, then the first ENTRY (i.e., sub-task) in the corresponding Walsh table is an EOL sub-task to be performed by path $\mathbf{56}_3$, whereas if bit 18 is 0, then the first ENTRY (i.e., sub-task) in the corresponding Walsh table is a Walsh sub-task to be performed by path $\mathbf{56}_2$. Bits 17 and 16 relate to an event process comparable to interrupt handling as may be generated in connection with the task instruction in FIG. 8, such as when the instruction task is being completed as in the example of when one or more symbols are written to a buffer as detailed above. In connection with the instruction, if bit 16 is set to 1, then at completion the finger task generates an event where that event may then be used in an interrupt-like sense to cause other non-task operations to occur. In a related sense, bit 17 allows one of two levels of priority to be associated with this potentially generated event, where by way of example a value of 0 indicates a lower priority and a value of 1 indicates a higher priority, and where to implement these different priorities then the event caused by the instruction may be written to either a corresponding high or low priority queue so that the event may be timely serviced according to its priority as well as its location in the queue.

Looking to the Finger_Task_w1, bit 15 permits an 8-bit mode to be enabled by setting this bit to 1. When bit 15 is not set, the 8-bit mode is not enabled and symbols are stored as 16 bits I and Q. However, in the 8-bit mode, the symbols for SF=8 and SF=16 are rounded or truncated or otherwise packed into an 8-bit quantity. Bits 14:5 permits a local adjustment due to any residual effects of phase rotation in the symbols, that is, this parameter specifies the carrier frequency adjustment applied on the incoming signal. In the preferred embodiment, this adjustment is performed on an entire 16 chip quantity rather than on a chip-level basis. Bits 4:0 specify which antenna input buffer from chip input buffer 52 is selected for the corresponding instruction. Bits 31:28 specify a frame offset which is known in the art. Bits 27:16 provide a finger path offset in that each finger task corresponds to a defined path with an associated delay. This delay (or offset) is described with respect to System Time in a number of chips and is the range of 0 through 2,047; preferably, this value is determined by the searcher functionality of correlator coprocessor 42 which performs a sliding window search correlation which determines the offset based on energy measurements.

Looking to the Finger_Task_w2, it includes only two parameters and presently the bits in Finger_Task_w3 are completely unused. In Finger_Task_w2, bits 15:0 provide a bit-by-bit PCG mask. Specifically, as known in the CDMA art, the transmission from a user station to base station configuration 20 is not quite continuous. More particularly, there is a 20 msec frame with 16 slots, where each such slot is sometimes referred to as a power control group ("PCG"). However, valid data is not necessarily communicated in each of the PCGs, so for those PCGs that are not occupied by valid data they may be disregarded using proper control. For example, when correlator coprocessor 42 is determining an EOL measure, it would be undesirable to include in those evaluations the invalid data (or lack of any data) in an unused PCG. Accordingly, the 16 bits 15:0 are provided as a mask to the corresponding 16 slots to mask out any one or more PCGs that are not to be evaluated. Typically, the PCG information is higher level information transmitted by the user station in a preceding frame, or it can be derived from a preceding frame. Lastly, bits 23:16 provide an indication, in combination with the user identification in bits 5:0 of Finger_Task_w0 into which buffer the result of the instruction is stored.

Figure 9:
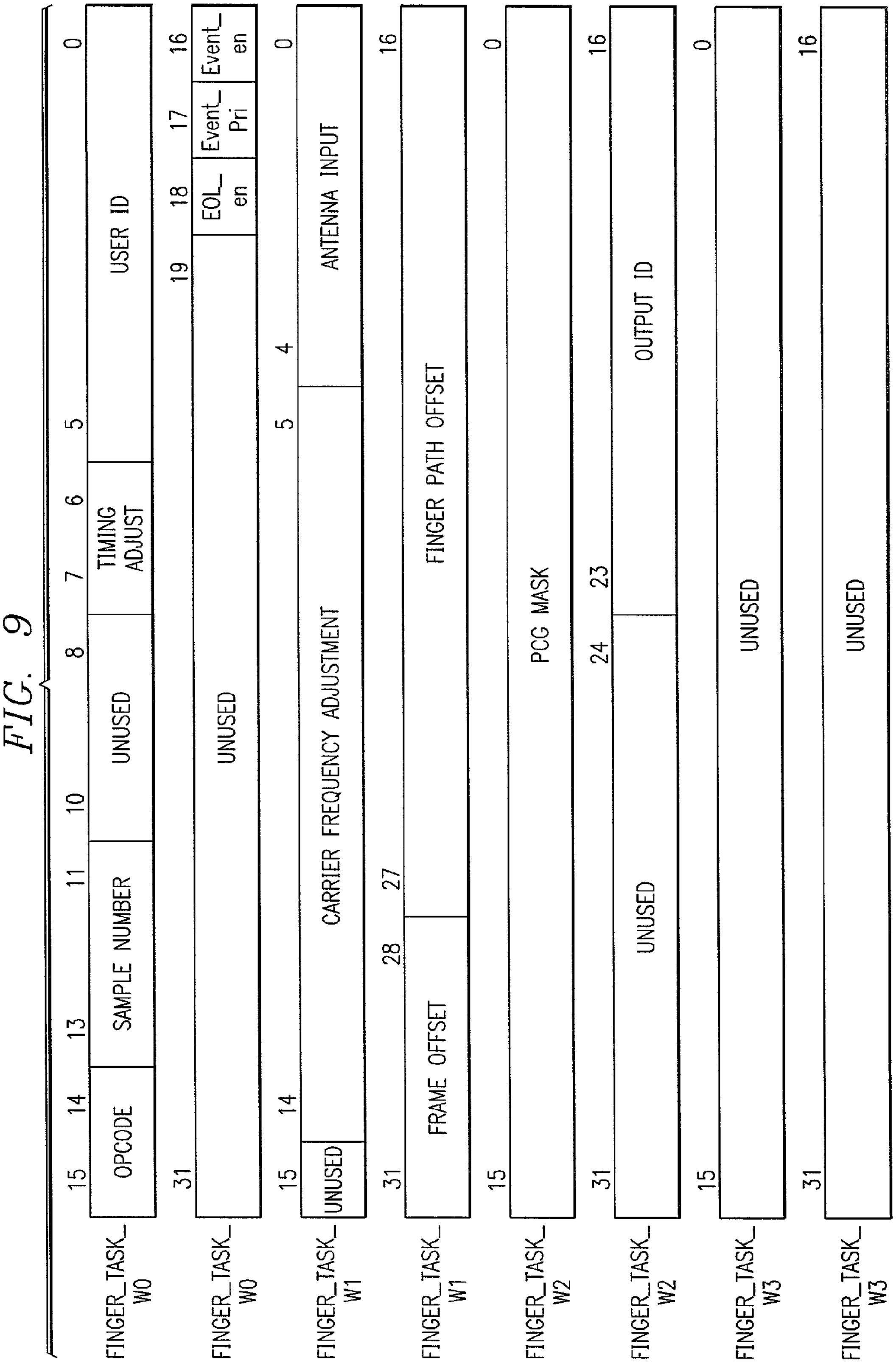
FIG. 9 illustrates the preferred format of a 128-bit instruction for causing the various RC 1&2 mode task operations in the correlator coprocessor.

FIG. 9 illustrates the preferred format of a 128-bit instruction for causing the various RC 1&2 mode task operations described above and according to the preferred embodiment. As stated above, the RC 1&2 mode operations in the preferred embodiment are a subset of the RC 3&4 mode operations. Accordingly, in the preferred embodiment the instruction format in FIG. 9 is a subset of the instruction format in FIG. 8 for the RC 3&4 mode instruction. As a result, one skilled in the art should readily ascertain the meaning and purpose for each of the values in FIG. 9 given the preceding detailed discussion in FIG. 8 of those values.

From the above, it may be appreciated that the above embodiments provide a versatile wireless communication system with a highly flexible and integrated base station, where the base station includes a RAKE receiver that performs finger tasks in response to instructions and the instructions are preferably provided by a DSP. As discussed throughout, the preferred embodiment therefore provides various benefits. As another example, by processing groups of chips (e.g., 16 preferred) per cycle, and with numerous cycles (e.g., 1,024 cycles) per iteration, a single iteration can effectively process a number of different types of operations and therefore achieve in effect a set of parallel operations on the chips. As another benefit, the single data path 56 has been shown to be programmable in that it may be configured to produce pilot symbols, non-pilot symbols, or EOL energy measures based on either pilot or non-pilot chips. As still another benefit, various circuitry is preferably formed in an ASIC wile DSP 26 provides instructions, and such an integrated approach is attractive to vendors of such solutions as it simplifies their implementation. As still another benefit, while the preferred embodiment has been illustrated in connection with certain protocols and standards, one skilled in the art may ascertain other contexts in which various of the inventive teachings may be implemented. As yet another benefit, certain of the above teaching may be altered in various additional respects. Consequently, while the present embodiments have been described in detail, various substitutions, modifications or alterations could be made to the descriptions set forth above without departing from the inventive scope which is defined by the following claims.

The invention claimed is:

1. A wireless base station, comprising:

at least one receive antenna for receiving communication signals from at least one transmitting station, the signals being spread with a plurality of chips;

circuitry for selecting a set of chips corresponding to a first signal received by the at least one receive antenna;

circuitry for forming a set of de-spread chips corresponding to the set of chips and in response to a code;

a functional data path comprising an accumulator for processing the set of de-spread chips; and circuitry for receiving an instruction;

wherein the functional data path is operable in response to a first instruction, received by the circuitry for receiving an instruction, to accumulate a first number of de-spread chips in the set of de-spread chips and for producing at least one corresponding symbol; and wherein the functional data path is operable in response to a second instruction, received by the circuitry for receiving an instruction, to accumulate a second number of de-spread chips in the set of de-spread chips and for producing an EOL measure.

2. The wireless base station of claim 1 wherein the functional data path is operable in response to the first instruction for producing at least one corresponding non-pilot symbol.

3. The wireless base station of claim 2 wherein the accumulator accumulates a number of de-spread chips equal to a spreading factor.

4. The wireless base station of claim 3:

wherein the set of chips consists of an integer number X chips;

wherein the first number is an integer number Y of de-spread chips; and wherein Y is equal to or less than X.

5. The wireless base station of claim 3 and further comprising a memory for storing the spreading factor.

6. The wireless base station of claim 5 wherein the memory stores the spreading factor as an entry in a table, and wherein the table comprises a plurality of entries.

7. The wireless base station of claim 6 wherein each of the plurality of entries comprises a spreading factor and a Walsh code.

8. The wireless base station of claim 7 wherein for a given cycle the code comprises a composite of a long code and a short code and the Walsh code in a corresponding one of the plurality of entries.

9. The wireless base station of claim 6 wherein the first instruction identifies a location of the plurality of entries.

10. The wireless base station of claim 6 wherein the functional data path is operable to perform a different cycle of operation in response to each enabled entry in the plurality of entries.

11. The wireless base station of claim 1 wherein the functional data path is operable in response to the first instruction for producing at least one corresponding pilot symbol.

12. The wireless base station of claim 11 wherein the accumulator accumulates a number of de-spread chips equal to a number specified in the first instruction.

13. The wireless base station of claim 12:

wherein the set of chips consists of an integer number X chips;

wherein the second number is an integer number Y of de-spread chips; and wherein Y is greater than X.

14. The wireless base station of claim 1:

wherein the accumulator comprises a first accumulator;

wherein the functional data path further comprises a second accumulator for processing in response to results provided by the first accumulator; and wherein the EOL measure is in response to results provided by both the first and the second accumulator.

15. The wireless base station of claim 14:

wherein the results provided by the first accumulator represent I and Q information corresponding to the second number of de-spread chips;

wherein the functional data path further comprises circuitry for estimating a value of $I^2+Q^2$; and wherein the second accumulator accumulates a number of the estimated values of $I^2+Q^2$.

16. The wireless base station of claim 15:

wherein the accumulator accumulates an integer number Z of the estimated values of $I^2+Q^2$;

and further comprising a memory for storing Z;

wherein the memory stores the Z in a location; and wherein the location is indicated by the second instruction.

17. The wireless base station of claim 14:

wherein the first accumulator accumulates a number of de-spread chips equal to a number specified in the second instruction; and wherein the second accumulator accumulates a number of results as specified in an entry in a memory table.

18. The wireless base station of claim 17 wherein the second instruction identifies a location of the entry in the memory table.

19. The wireless base station of claim 1 wherein the circuitry for forming a set of de-spread chips and the functional data path are part of an application specific integrated circuit.

20. The wireless base station of claim 1 and further comprising circuitry for issuing the instruction.

21. The wireless base station of claim 20 wherein the circuitry for issuing the instruction comprises a digital signal processor.

22. The wireless base station of claim 1 wherein the code comprises a long code.

23. The wireless base station of claim 1 wherein the code comprises a composite of a long code and a short code.

24. The wireless base station of claim 1 wherein the code comprises a composite of a long code and a short code and a Walsh code.

25. The wireless base station of claim 1 wherein the communication signals comprise code division multiple access communication signals.

26. The wireless base station of claim 1 wherein the communication signals comprise code division multiple access Radio Configuration 3 and 4 communication signals.

27. The wireless base station of claim 1 wherein the communication signals comprise code division multiple access Radio Configuration 1 and 2 communication signals.

28. The wireless base station of claim 1 and further comprising circuitry for sampling the communication signals at a plurality of sample times per chip time and for producing corresponding sets of chip sample sets, wherein the set of chips is selected as one set from the sets of chip sample sets.

* * * * *